US008605400B2

(12) United States Patent
Wetter et al.

(10) Patent No.: US 8,605,400 B2

(45) Date of Patent: Dec. 10, 2013

(54) DEVICE FOR DIVERTING SURGE CURRENTS OR TRANSIENT OVERVOLTAGES

(75) Inventors: Martin Wetter, Detmold (DE); Gernot Finis, Kassel (DE); Joachim Cerny, Bielefeld (DE); Ernst-Dieter Wilkening, Braunschweig (DE); Björn Bünsow, Wathlingen (DE); Rainer Durth, Horn-Bad Meinberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 179 days.

(21) Appl. No.: 13/015,177

(22) Filed: Jan. 27, 2011

(65) Prior Publication Data

US 2011/0188162 A1 Aug. 4, 2011

(30) Foreign Application Priority Data

Feb. 1, 2010 (DE) ........................ 10 2010 006 525

(51) Int. Cl.
*H02H 3/22* (2006.01)

(52) U.S. Cl.
USPC .......................................... 361/91.1; 361/111

(58) Field of Classification Search
USPC .......................................... 361/56, 91.1, 111
See application file for complete search history.

(56) References Cited

U.S. PATENT DOCUMENTS 5,703,743 A * 12/1997 Lee .................................. 361/6
7,430,101 B2 * 9/2008 Komulainen et al. ......... 361/111
2006/0250732 A1 * 11/2006 Peachey .......................... 361/56
2008/0084642 A1 4/2008 Kato et al.

FOREIGN PATENT DOCUMENTS

CN 1170214 A 1/1998
CN 101136582 A 3/2008
DE 102006053367 A1 5/2008

OTHER PUBLICATIONS

Westcode, "Insulated Gate Bi-Polar Transistor Type TO800TA45E", An OIXYS Company, Provisional Data Sheet:-1, pp. 1-7, (Dec. 14, 2005).

* cited by examiner

*Primary Examiner* — Danny Nguyen
(74) *Attorney, Agent, or Firm* — Nath, Goldberg & Meyer; Jerald L. Meyer; Stanley N. Protigal

(57) ABSTRACT

The subject matter of the invention is a device for diverting surge currents or transient overvoltages (1), with a switching stage (2) and a switching element (3). The switching stage (2) is so designed as to switch on the switching element (3) upon identification of an overvoltage or a surge current. The switching element (3) is a reversible semiconductor switching element, while the switch-on event is achieved by operating of the switching element (3) outside of the specified parameters.

10 Claims, 4 Drawing Sheets

Surge Current 8/20, 40°C

DEVICE FOR DIVERTING SURGE CURRENTS OR TRANSIENT OVERVOLTAGES

BACKGROUND

1. Technical Field

The invention relates to a device for diverting surge currents or transient overvoltages and to the use of IGBTs as switching elements in a device for diverting surge currents or transient overvoltages.

Strong surge currents arise, e.g., in a direct lightning strike, due to induction caused by a lightning strike in the immediate environment, or upon starting a machine, or because of electrostatic charging.

These surge current create problems for a large number of electrical devices and appliances, which they may destroy.

2. Description of Related Art

Known devices for diverting surge currents or overvoltages are based on varistors and/or gaseous diverters and/or spark gaps, each in combination with a thermal separator. With respect to its function in a surge protector, each of these components has a different area of application, with corresponding advantages and disadvantages.

Depending on the purpose to which they are applied, these devices are also generally known as lightning strike diverters, overvoltage diverters, and overvoltage protectors, or (in English) surge protective devices (SPD).

The surge currents that arise during the different events are typically designated in relation to a characteristic form taken by the surge current. In testing and certification a distinction is made between a so-called 10/350 μs surge current (referred to below as 10/350 μs), which is characteristic for lightning current, and an 8/20 μs surge current (referred to below as 8/20 μs), which is characteristic for the other cases.

These surge current pulses are standardized and reproduced by way of example in FIGS. 1 and 2. In FIG. 2, the area beneath the curves provides a measure for the diverted energy.

Depending on their intended purpose, protective devices are tested using the appropriate test pulses and are divided into protective classes.

This division into classes or types permits a classification according to the surge current carrying capacity. Here type 1 diverters have a very high carrying capacity, and, in corresponding fashion, type 2 and 3 diverters have a lower carrying capacity.

In the known devices a strong diverted current can result in the destruction of the protective device.

SUMMARY

The invention is based on the problem of providing improved protective devices which can also divert high surge currents in a reliable manner and can be reused many times.

The invention solves this problem with the features of the independent claims. Advantageous elaborations of the invention are indicated in the secondary claims.

BRIEF DESCRIPTION OF THE DRAWINGS

The invention is next described in greater detail on the basis of preferred embodiments, with reference to the attached drawing.

Shown are.

DETAILED DESCRIPTION

Figure 1:
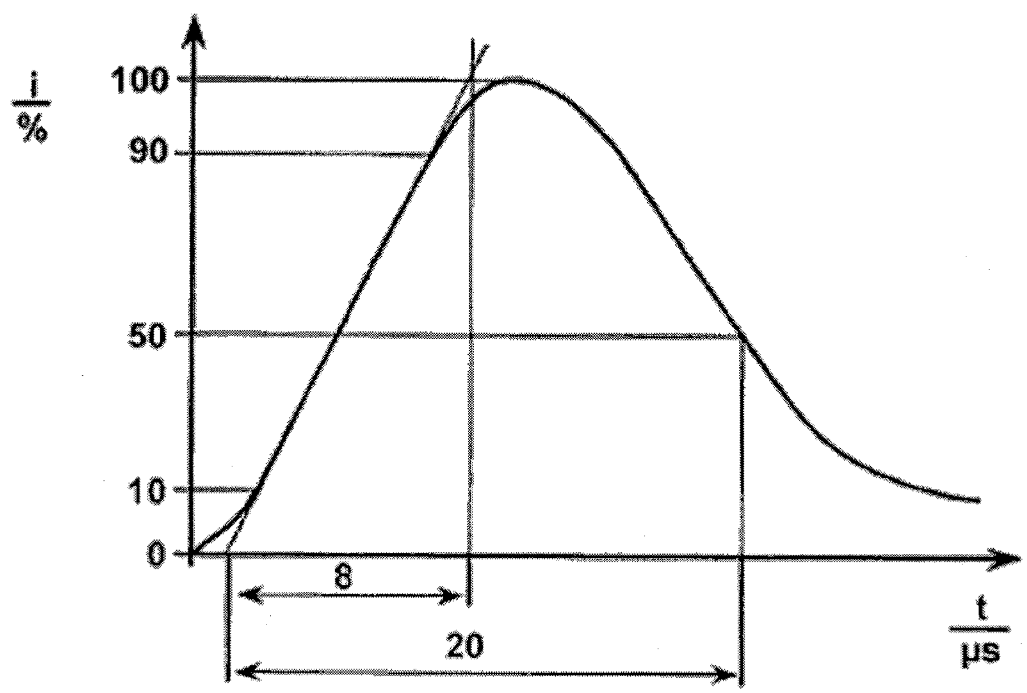
FIG. 1 curve of a test surge current for an 8/20 μs surge current
Figure 2:
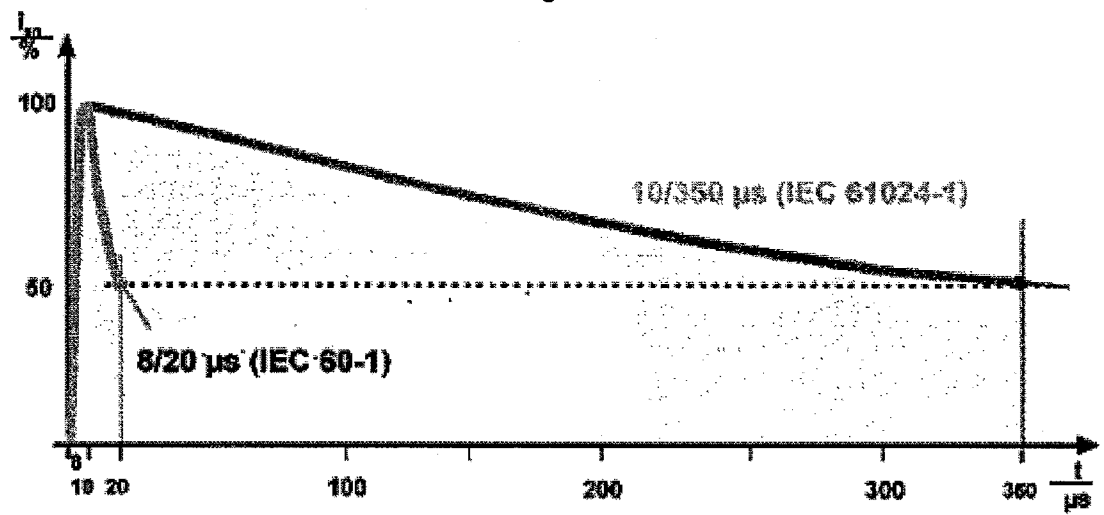
FIG. 2 curve of a test surge current for a 10/350 μs surge current in relation to the curve of a test surge current for an 8/20 μs surge current FIG. 3 general arrangement for a device for diverting surge currents.
Figure 3:
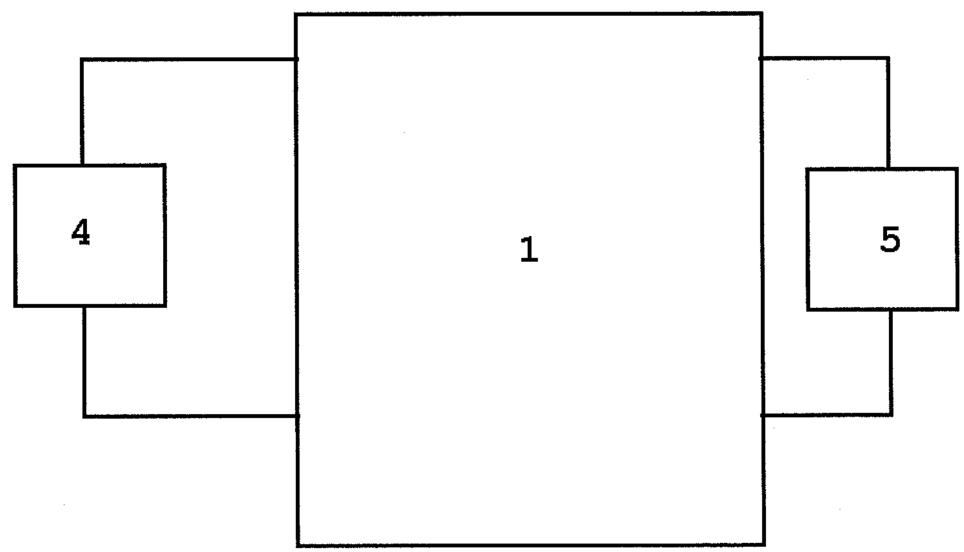

FIG. 3 depicts a general arrangement for a device for diverting surge currents.

On its output side this device 1 is connected to a typical appliance that consumes energy 5. This appliance 5 is to be protected from surge currents/overvoltages.

In normal operation the device 1 is connected on its input side to an energy source 4.

The connection to the energy source 4 is not absolutely necessary, since unconnected appliances are also to be protected from destructive effects.

Figure 4:
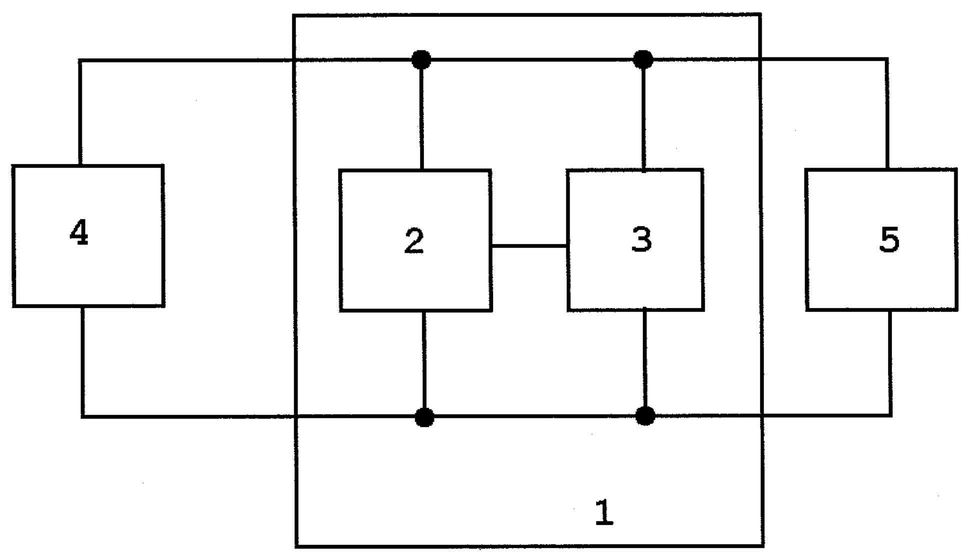
FIG. 4 embodiment of a device for diverting surge currents according to the invention FIG. 5 detailed embodiment of a device for diverting surge currents according to the invention FIG. 6 results for 3 different IGBT types—type A, type B, and type C FIG. 7 another embodiment of a device for diverting surge currents according to the invention FIG. 8 another embodiment of a device for diverting surge currents according to the invention

FIG. 4 schematically depicts a circuit exhibiting an embodiment of the device 1 for diverting surge currents according to the invention.

Positioned in this device 1 is a switching stage 2 and a switching element 3.

The switching stage 2 is so designed that upon identification of a surge current it will cause the switching element 3 to switch on and thereby divert the surge current/overvoltage.

The switching element 3 here is a semiconductor that can be switched off again. This reversible semiconductor switching element is operated outside of a specified parameter.

Figure 5:
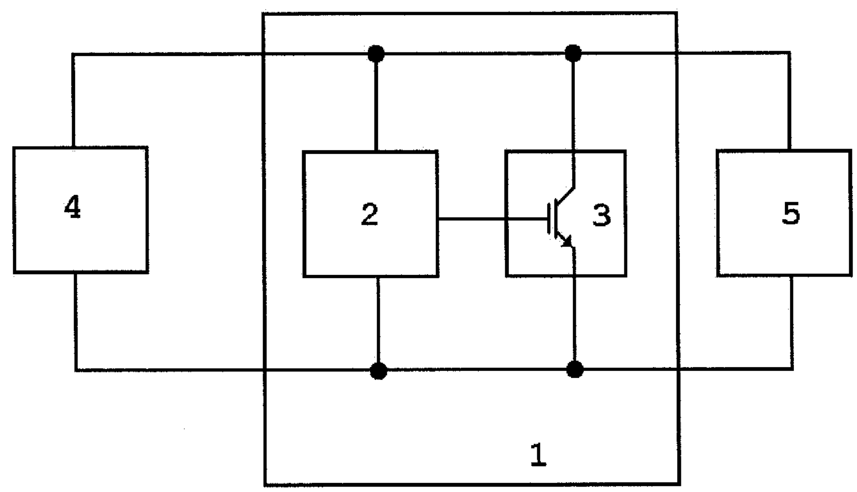

In a preferred embodiment the reversible semiconductor switch element 3 is an IGBT (insulated gate bipolar transistor), as indicated in FIG. 5 by the switch symbol.

The advantage of IGBTs is that they can switch currents on and off even when there is an adjacent mains voltage. This fulfills two demands that are placed on a diverter—specifically, to divert the surge current by switching on the semiconductor and to suppress any potential mains follow current by switching off the semiconductor.

Typically the gate emitter voltage for continuous operation must not exceed 20 V. This prevents the thin insulating layer underneath the gate from rupturing and thereby destroying the IGBT.

In customary applications an operating point is frequently selected at 15 V in order to minimize switching losses and switching times.

If IGBTs are operated within the parameters, IGBTs can run rated currents of up to 3 kA in continuous operation.

In the applicant's experience, IGBTs can divert surge currents of up to five times the rated current when the gate is operated in customary fashion (gate emitter voltage: $U_{GE}$=15 V).

However, if the surge current amplitudes are larger, there is a so-called "desaturation" effect. This means that there are not enough charge carriers available in the semiconductor, with the result that the conductive channel is desaturated and its resistance rises very quickly and very significantly. Surge currents which clearly exceed this value generally result in the destruction of the semiconductor.

In another preferred embodiment the reversible semiconductor element 3 is an IGBT, which is operated with an increased gate emitter voltage.

In the applicant's further experience, for (short-term) operation with a gate emitter voltage that clearly exceeds the specification, IGBTs can divert considerably higher pulsed currents than the already indicated value of five times the rated current.

Figure 6:
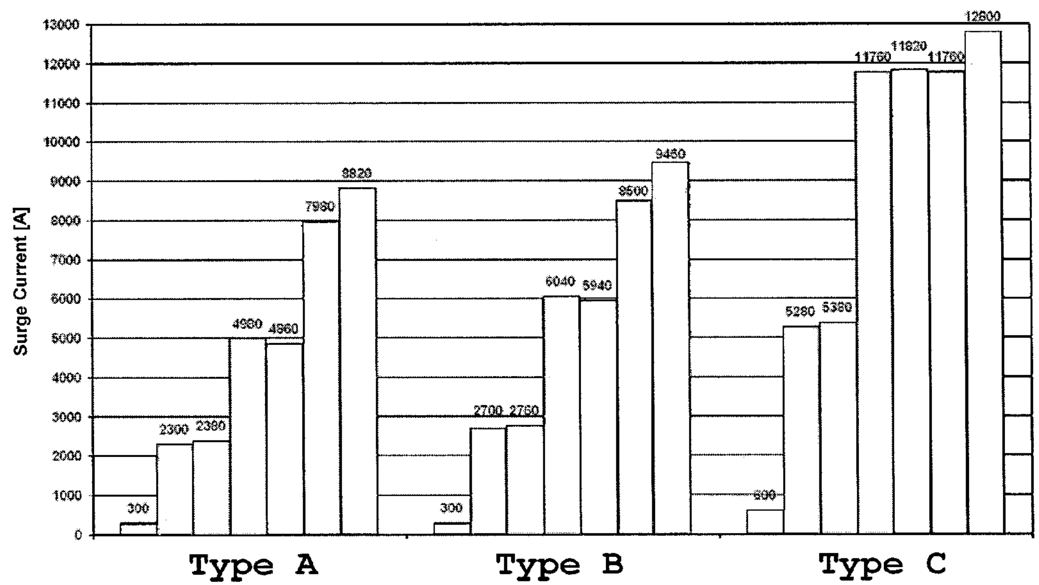

This knowledge is further elaborated by means of the findings depicted in FIG. 6.

For example, IGBTs with a rated current of $I_N$=300 A can divert a transient surge current in $\hat{i}$=9.5 kA (8/20 μs) without interference and without desaturation, given a statically applied gate emitter voltage of $U_{GE}$=45 V.

FIG. 6 provides findings for 3 different types of IGBTs—type A, type B, and type C.

For each type, the first column indicates the rated current, which is 300 A for the types investigated.

The second and third columns each show the findings for surge current load and operation of the gate within the gate emitter voltage specified for continuous operation.

In the present case the maximal gate emitter voltage for continuous operation was 20 V and the IGBTs were operated with 15 V. Here it is evident that the surge current carrying capacity is higher by a multiple than the continuous current carrying capacity.

The fourth and fifth columns each show the results for surge current load and operation of the gate outside the specified gate emitter voltage for continuous operation. In the present case the maximal gate emitter voltage for continuous operation was 20 V and the IGBTs were operated with 30 V. Here it is evident that the surge current carrying capacity is higher by a multiple than the continuous current carrying capacity and is also noticeably high (about 2 to 3 time higher) than the surge current carrying capacity for operation within the gate emitter voltage specified for continuous operation.

The sixth and seventh columns each show the findings for surge current load and operation of the gate far outside the gate emitter voltage specified for continuous operation.

In the present case the maximal gate emitter voltage for continuous operation was 20 V. The IGBTs of type A were operated with 45 V (sixth column) and 50 V (seventh column). IGBTs of type B were operated with 40 V (sixth column) and 45 V (seventh column), and IGBTs of type C were operated with 30 V (sixth column) and 35 V (seventh column).

Here it is evident that the surge current carrying capacity is higher by a multiple than the continuous current carrying capacity and is also noticeably higher (about 2 to 3 times higher) than the surge current carrying capacity for operation within the gate emitter voltage specified for continuous operation.

Further investigations showed that the possible gate emitter voltage can also be increased when it is not applied statically, but rather in short-term or transient fashion.

In the applicant's opinion, the maximum possible diversion current of IGBTs for a noticeably increased gate emitter voltage appears to be basically dependent on the surge current amplitude, without being fundamentally affected by form of the curve.

This can be explained by the fact that the semiconductor element must provide only the quantity of charge carriers needed to carry the surge current.

The time length of the current flow is negligible due to the extremely low forward resistance.

It is consequently possible to employ this technology as the basis for effective lightning current diverters.

Figure 7:
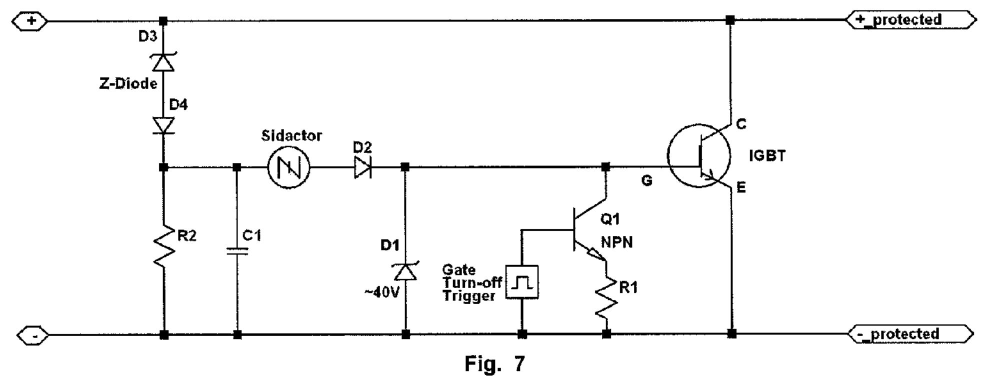

FIG. 7 depicts one possibility for constructing a device 1 for diverting surge current in accordance with the invention.

Here an IGBT is employed as a switching element 3. This IGBT is, e.g., inserted as a so-called "crowbar" between the current's two conductive paths—the "+_protected" current path and the "−_protected" current path.

If the IGBT is switched on, there is a short circuit, which is protected by an appliance 5 attached to the protected side, which is designated as "protected". The length of the short circuit can range from microseconds up to several milliseconds.

By using an IGBT this short circuit can also be switched off.

IGBTs represent voltage-controlled switches. However, these switches exhibit losses in certain areas, specifically when the parasitic gate capacitance $C_G$ is insufficiently charged.

For this reason, the embodiment in FIG. 7 possesses further components, several of which have the task of charging the gate capacitance as quickly as possible up to the intended switching voltage of 20 V or more, and thus to quickly abandon the lossy control range of the partial charge.

Overloading the switching voltage is to be prevented by suitable means, since otherwise there is a danger of destroying the device.

The mode of operation of this first embodiment is next explained in greater detail on the basis of FIG. 7.

First to be described is the switch-on event and thus the introduction of a "short circuit" via the switching element 3.

For the sake of simplicity, a unipolar switch type or model is depicted, i.e., a direct current type. It is immediately evident to the specialist, however, that in alternating current operation two such switch types can be combined in antiparallel fashion. Consequently only the unipolar type is described below.

In the embodiment shown in FIG. 7, the response behavior/protective level is adjusted through suitable sizing of the Z-diode D3. The Z-diode D3 becomes conductive as soon as the voltage exceeds the breakdown voltage $V_{BO}$ of the Z-diode D3 on the input side (designated as "+" and "−").

By implication, it is also possible to insert other switches whose purpose is to provide an adjustable response voltage or an automatic rated voltage identification.

If the Z-diode D3 is conductive, the capacitor C1 is charged over the diode D4. D4 can also prevent a discharge while the switching element 3 is turned on, e.g., in the event that the input-side voltage breaks down.

In a preferred embodiment the capacitance is selected so as to be of a comparable or greater magnitude than the capacitance that is realized as the gate is approached. Here a careful estimate for a lower limit represents a capacitance that is about twice as large as the gate capacitance $C_G$ itself.

Furthermore, a sidactor is provided in the exemplary embodiment of FIG. 7.

If the threshold value of the sidactor is reached through charging of the capacitor C1, the sidactor fires. Firing of the sidactor results in an extremely rapid charging of the gate capacitance $C_G$. In this way the switching element 3 can be fed with the switching voltage in the shortest period of time, so that the lossy control range of the partial charge is quickly abandoned.

Here the sidactor remains conductive until the holding current $I_H$ is underrun.

The resistor R2 has the task of slowly discharging the capacitor C1, e.g., after a diverting process has ended, or when the capacitor has already been loaded but a diverting process was not required.

In the depicted embodiment, moreover, there is provided a Z-diode D1 which limits the gate emitter potential to a maximally permitted value. This maximally permitted value is equal to 20 V or more. This maximally permitted value is greater than the value for continuous operation. It is self-evident that, as long as the switching element 3 is not through-driven, the Z-diode D1 is a part of the diversion path and should be sized accordingly.

In another embodiment, yet another resistor $R_{gate}$ can be provided in the direction of the gate in order to limit the charging current during charging of the gate capacitance.

In another embodiment, furthermore, it can be provided that a power diode is also positioned in the controlled path from the collector C to the emitter E of the switching element 3 (i.e., in serial connection), in order to improve the reverse blocking capability.

Now that the switch-on process has been discussed, the switch-off process will be described in greater detail.

It should be noted that, due to its voltage control, the switching element 3 remains conductive until it is cut off.

In order to provide an active switch-off capability, it is suggested that a switch-off path be provided. This switch-off path can realized, e.g., by a switch Q1 and R1.

The switch Q1 can be, e.g., a transistor, without restriction as to a specific technology.

If the switch-off path is in a resting state, the transistor Q1 is locked; in the circuit diagram the switch would be opened.

At the end of a surge current/overvoltage event the "gate-turn-off" trigger switches on the switch Q1, i.e., the transistor Q1 is driven through.

This switch-on event in turn ensures a rapid discharge of the gate capacitance, so that the lossy control area of the partial charge is quickly abandoned.

The length of the discharge and the discharge current can be determined by R1.

After a predetermined period of time the "gate-turn-off" trigger again switches off the switch Q1.

A suitable "gate-off-turn" trigger can be any kind of recognition circuit that recognizes the end of a surge current/overvoltage event. A suitable "gate-turn-off" trigger will advantageously provide a square-wave signal of a specific amplitude and period, which are sized in such a way that the switching element 3 is discharged.

Suitable recognition circuits can be based, e.g., on the fact that they evaluate the change in current over time (dI/dt measurement), e.g., slope and zero crossing. Proven circuits are based on, e.g., an inductive coupling.

In the following the operating mode of a second embodiment, shown in FIG. 8, will be described in greater detail.

The switch-on process will first be described, i.e., the introduction of a "short circuit" via the switching element 3.

For the sake of simplicity, a unipolar switch type or model is depicted, i.e., a direct current type. It is immediately evident to the specialist, however, that for alternating current operation, two such switch types can be combined in antiparallel fashion. Consequently only the unipolar type is described below.

Figure 8:
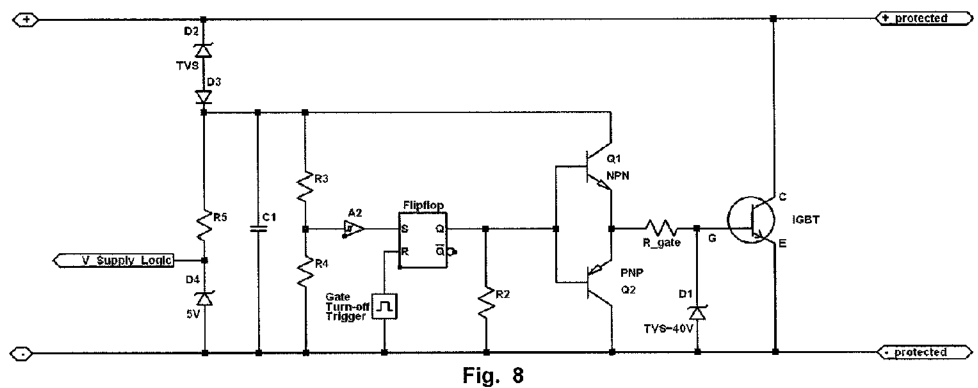

In the embodiment shown in FIG. 8, the response behavior/protective level is adjusted by the suitable dimensional design of the TVS-diode (transient voltage suppressor diode) D2. The TVS-diode D2 becomes conductive as soon as the voltage exceeds the breakdown voltage $V_{BO}$ of the TVS-diode D2 on the input side (designated as "+" and "−").

By implication, it is also possible to insert other switches whose purpose is to realize an adjustable response voltage or provide an automatic rated voltage identification.

If the TVS-diode D2 is conductive, the capacitor C1 is charged over the diode D3. D3 can also prevent a discharge when the switching element 3 is turned on, e.g., in the event that the input-side voltage breaks down.

In a preferred embodiment the capacitance is selected so as to be of a comparable or greater magnitude than the capacitance that is realized as the gate is approached.

This measure ensures that, in addition to the gateway capacitance that is meant to be charged, there is also sufficient energy present to supply other components while the process of diversion is underway. These other components and their function will now be described in greater detail.

If the TVS diode D2 has become conductive, the capacitor C1 is charged and the components A2 and a flip-flop are fed with the supply voltage "V_supply_logic" via the voltage regulator consisting of R5 and D4.

The voltage across the capacitor C1 is monitored by the Schmitt trigger A2 and the voltage regulator formed by R3 and R4.

If the capacitor reaches a predetermined voltage, a voltage higher than the upper switching level is established by the voltage regulator R3/R4 at the input of the Schmitt trigger A2, and the Schmitt trigger A2 drives the input of the flip-flop.

The output of the flip-flop in turn controls a complementary emitter follower, which is formed by Q1 and Q2. Q1 and Q2 can be transistors, without restrictions as to a specific technology.

The emitter follower, which is formed by Q1 and Q2, in turn drives the gate of the switching element 3, which is an IGBT.

The flip-flop's driving of the bases of the transistors Q1 and Q2 corresponds to the sidactor's firing in the embodiment of FIG. 7.

The control of the bases—Q2 is blocked, Q1 is open—leads to an extremely rapid charging of the gate capacitance $C_G$ due to discharging of the capacitor C1. As a result, the switching element 3 can be fed with the switching voltage in the shortest period of time, so that the lossy control area of the partial charge is quickly abandoned.

In a further embodiment another resistor $R_{gate}$ can also be provided in the direction of the gate in order to restrict the charging current when the gate capacitance is being charged.

In the depicted embodiment, moreover, there is provided a TVS-diode D1 which limits the gate emitter potential to a maximally permitted value. This maximally permitted value is equal to 20 V or more. This maximally permitted value is greater than the value for continuous operation. It is understood that as long as the switching element 3 is not driven in forward fashion the TVS diode D1 is a part of the diversion path and must be sized accordingly.

In another embodiment, furthermore, it can be provided that a power diode is positioned in the controlled path from the collector C to the emitter E of the switching element 3, in order to improve the reverse blocking capability.

Now that the switch-on process has been discussed, the switch-off process will be described in greater detail.

It should be noted that, due to its voltage control, the switching element 3 remains conductive until it is cut off.

In order to provide an active switch-off capability, it is proposed that a switch-off path is provided. This switch-off path can realized, e.g., by resetting the flip-flop, which in turn is driven by a "gate-turn-off" trigger.

At the end of a surge current/overvoltage event the "gate-turn-off" trigger resets the flip-flop, i.e., the emitter follower Q1/Q2 is driven in contrary fashion—Q1 is blocked, Q2 is opened—and this action leads to in an extremely rapid discharge of the gate capacitance $C_G$. In this way the switching element 3 can be charged in a very short time, so that the lossy control area of the partial charge is quickly abandoned.

A suitable "gate-off-turn" trigger can be any kind of recognition circuit which recognizes the end of a surge current/overvoltage event. A suitable "gate-off-turn" trigger will advantageously provide a square-wave signal of a specific amplitude and period, which are sized in such a way that the switching element 3 is discharged.

Suitable recognition circuits can be based, e.g., on the fact that they evaluate the change in current over time (dI/dt measurement), e.g., slope and zero crossing are identified. Proven circuits are based on, e.g., an inductive coupling.

In addition, the capacitor C1 can be slowly discharged over the voltage divider R3/R4. In this way the circuit can again be brought back to its starting point.

It is immediately evident to the specialist that circuit parts that work to the same effect in the embodiments shown in FIGS. 7 and 8 are interchangeable.

In other embodiments the devices may dispose over display means which acoustically and/or optically display the response to a surge current/overvoltage or report it by transmission to other systems.

For switching on the switching element, the suitable selection of components makes it possible to achieve switching times of less than 1 microsecond.

Likewise, the suitable selection of components makes it possible to achieve switching times of less than 1 microsecond for switching off the switching element.

LIST OF REFERENCE NUMERALS

1 device for diverting surge currents
2 switching stage
3 switching element, IGBT
4 energy source
5 electrical appliance
D1 Z-diode (FIG. 7), TVS-diode (FIG. 8)
D2 TVS-diode (FIG. 8), diode (FIG. 7)
D3 Z-diode (FIG. 7), diode (FIG. 8)
D4 diode
C1 capacitor
R1, R2, R3, R4 resistor
Q1, Q2 transistor
A2 A2, Schmitt trigger

The invention claimed is:

1. A device for diverting surge currents or transient overvoltages, comprising:

a switching stage and a switching element, such that the switching stage is so designed that upon identification of an overvoltage or a surge current the switching element is switched on, wherein the switching element comprises a reversible semiconductor switching element and the switch-on event is achieved by operating the switching element within a predetermined range above a specified range of a gate emitter voltage for continuous operation of the switching element to effect surge current operation with a gate emitter voltage that clearly exceeds a design specification of the reversible switching element for continuous operation, causing the reversible switching element to divert considerably higher pulsed currents without interference and without desaturation than the design specification for continuous operation.

2. The device according to claim 1, where the switching element is switched on in order to divert an identified surge current or an identified overvoltage.

3. The device according to claim 1, where the switching element is an IGBT.

4. The device according to claim 1, wherein the switching time for the switch-on is less than 1 microsecond.

5. The device according to claim 1, wherein the switching time for the switch-off is less than 1 microsecond.

6. The device according to claim 1, wherein the specified parameter for the switching element is a voltage specified for continuous operation in order to avoid voltage breakdowns.

7. The device according to claim 1, wherein the device can be provided with the energy needed for switch-on by a current pulse.

8. Using of IGBTs as a switching element in a device for diverting surge currents or transients overvoltages, with the switching stage and a switching element, where the switching stage is so arranged that upon identification of an overvoltage the switching element is switched on, wherein the potential between the gate and the emitter of switching element is 20 volts or more, and wherein the potential between the gate and the emitter is within a predetermined range above a specified range for continuous operation to effect surge current operation with a gate emitter voltage that clearly exceeds a design specification of the reversible switching element for continuous operation, causing the reversible switching element to divert considerably higher pulsed currents without interference and without desaturation than the design specification for continuous operation.

9. The using of IGBTs as a switching element in a device according to claim 8, wherein the switch-on of the switching element brings about diversion of an identified surge current or an identified overvoltage.

10. The using of IGBTs as a switching element in a device according to claim 8, wherein the potential between the gate and the emitter of the switching element is only applied in the course of an identified surge current and or an identified overvoltage.

* * * * *